Jan. 4, 1927.

J. BAYLIN 1,613,263

WINDSHIELD CLEANER

Filed Nov. 6, 1925

INVENTOR
J. Baylin
BY E. J. Fetherstonhaugh
ATTORNEY

Patented Jan. 4, 1927.

1,613,263

UNITED STATES PATENT OFFICE.

JACOB BAYLIN, OF MONTREAL, QUEBEC, CANADA.

WINDSHIELD CLEANER.

Application filed November 6, 1925. Serial No. 67,322.

The invention relates to a windshield cleaner as described in the present specification and illustrated in the accompanying drawings that form part of the same.

The invention consists essentially of the novel features of construction pointed out in the claim for novelty following a description in detail of an acceptable form of the invention.

The objects of the invention are to produce a wind shield cleaner that will be applicable to any power driven vehicle such as motor cars, trolley cars, locomotives and the like; to establish a device on the market that will completely avoid all trouble and dangers incident to cleaning the windshield or glass during a snow or rain storm, to furnish a means whereby the windshield will be continuously kept clear of any accumulated matter such as snow, sleet, rain or dust and thereby allowing the driver of the vehicle to give his complete attention to the steering and control of his machine; to supply a cleaner wherein it can be regulated to clean the windshield in specified sections; and generally to provide a neat and effective mechanism, cheap to manufacture and durable in construction.

In the drawings, Figure 1 is a perspective view of the device enclosed in a suitable casing and in use.

Like numerals of reference indicate corresponding parts in the various figures.

Figure 1:
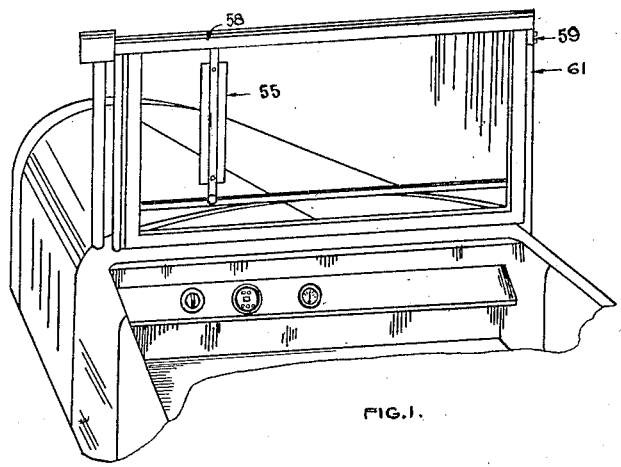
Figure 2:
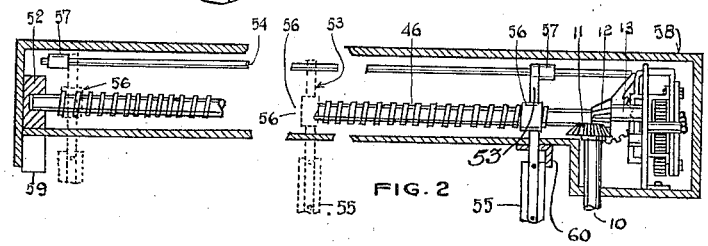
Figure 2 is a longitudinal sectional view of the device.
Figure 3:
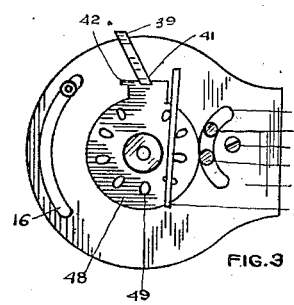
Figure 3 is an enlarged end detail of the frame plate and operating mechanism.
Figure 4:
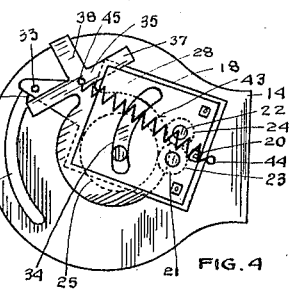
Figure 4 is an enlarged end detail of the inverted side of the frame plate showing the operating mechanism on that side.
Figure 7:
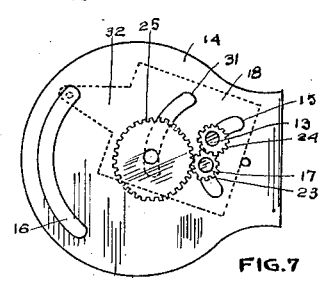
Figure 7 is a plan view of the change gears.
Figure 6:
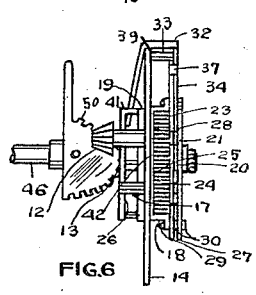
Figure 6 is a side elevation of the device.
Figure 5:
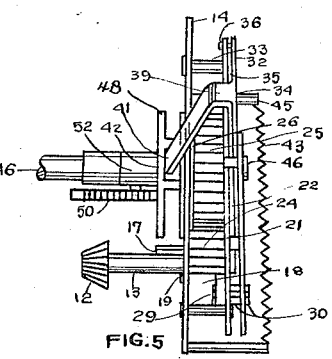
Figure 5 is a top plan view of the device.

Referring to the drawings the mechanism of the windshield cleaner is suitably operated from the engine of the vehicle either by electrical means or drive from the motor in which a rotating shaft 10 having a bevel gear 11 coacts with a bevel gear 12 rigidly secured to the rotatable shaft 13 of the mechanism.

The frame plate 14 of the mechanism has an outer arcuate slot 15 and an inner arcuate slot 16, the former slide slot being arc- shape and forming slide bearings for the shaft 13 and a guide for the pinion shaft 17.

A tilting member 18 is pivotally secured through a screw 19 and nut 20 to the frame plate and completely covers the lower slot 15 and has the shaft orifices 21 and 22 for the shaft 13 and pinion shaft 17, the latter having at their inner ends the operating pinions 23 and 24 and which coact with the main gear wheel 25 alternately subject to the operation of the sprocket gear 26.

The guide plates 27 and 28 are rigidly secured to the tilting member 18 by the bolts and nuts 29 and 30 and have corresponding arcuate slots 31. The guide plate 27 has the arm 32 projecting upwardly and engaging the upper slot 16 of the frame plate 14 under the straddle member 33.

Between the guide plates 27 and 28 the plate 34 is inserted and mounted on the main shaft having the transverse arms 35 at its upper end, said arms 35 having inturned gripping ends 36 and 37 forming draw members for the guide pin 33 from the guide plate 27.

Midway of the cross arms the strip 34 projects upwardly and forms itself into a loop 39 and straddles said frame plate 14 and having one end 41 extending downwardly and engaging with the guide lug 42.

The plate 34 is spring-held to its position by the spring 43 having one end secured to the stud 44 rigid with the frame plate 14 and the other end secured to the stud 45. This plate 34 is also pivotally secured to the main driving worm shaft 46 which is mounted in the bearing 47 of the main frame plate.

The rotating guide 42 forms a part of the rotating wheel 48 having a plurality of slots 49, this wheel is rigidly secured to the worm shaft 46 and forms the oscillating factor for the sprocket gear 50 which is pivotally secured to the collar encircling the shaft 46, the shaft 46 being mounted at the other end in the bearing 52.

The cleaning member is formed of the rod 53 having its upper end encircling the guide rod 54 and its lower end into the pad cleaning portion 55. Midway of the rod 53 the travelling nut 56 is secured and encircles the worm shaft 46 and travels to and fro thereon.

The guide rod 54 is encircled by two or more movable stops 57 which are adapted to be fixedly secured thereto. This guide rod is rigidly secured to one end of the sprocket gear 50.

The whole mechanism is suitable enclosed in the casing 58 held by the brackets 59 and 60 bolted to the vehicle frame 61, and having a longitudinal slot 62 for the travelling motion of said cleaning member.

In the operation of the device, the worm shaft is rotated by the mechanism as described and this rotation causes the nut 56 to travel to and fro thereon and by fixing the stops at specified points on the guide rod the cleaning member rod will press against one of the stops when pushed in that position through the rotating motion of the worm shaft, the pressure will then cause the guide rod to pull on the sprocket gear which will automatically reverse the gearing and the rotation of the worm shaft will be changed thereby returning the cleaning member back to its original position when the same action occurs.

What I claim is:—

In a device of the kind described, a horizontal worm shaft and guide rod, a main plate forming a bearing for one end of the worm shaft and having an upper and lower slot, a bracket pivotally secured to said main plate and containing intermeshing gears having the rotating members thereof projecting through said bracket and into the lower slot of said main plate, a main drive gear intermeshing with said other gears and rigidly secured to said horizontal shaft, guide plates rigidly secured to said bracket and having a projecting strip from one of said plates and engaging with said upper slot of said main plate, a semi-circular plate betweeen said guide plates and having cross strips forming pusher bars for said guide strip and having a vertical strip straddling said main plate, a rotating wheel secured to said worm shaft and having a plurality of slots and a guide, the latter adapted to be engaged by said vertical strip, a sprocket wheel engaging said rotating wheel and having one end joined to said guide rod, stops on said guide rod, a member engaging said worm shaft and guide rod and operated by the former and controlling the latter, and a casing enclosing said mechanism.

Signed at Montreal, Canada, this 14th day of October, 1925.

JACOB BAYLIN.